(12) United States Patent
Lerner et al.

(10) Patent No.: US 8,033,400 B2
(45) Date of Patent: Oct. 11, 2011

(54) NON-WOVEN POLYMERIC FABRIC INCLUDING AGGLOMERATES OF ALUMINUM HYDROXIDE NANO-FIBERS FOR FILTERING WATER

(75) Inventors: Marat Izrailievich Lerner, Tomsk (RU); Gennady Evgenievich Rudenskiy, Tomsk (RU); Sergey Grigorievich Psakhie, Tomsk (RU); Natalia Valentinovna Svarovskaya, Tomsk (RU); Vladimir Evgenievich Repin, Novosibirsk (RU); Vladimir Georgievich Pugachev, Novosibirsk (RU)

(73) Assignee: Advanced Powder Technologies, LLC, Tomsk (RU)

( * ) Notice: Subject to any disclaimer, the term of this patent is extended or adjusted under 35 U.S.C. 154(b) by 0 days.

(21) Appl. No.: 12/025,543

(22) Filed: Feb. 4, 2008

(65) Prior Publication Data
US 2008/0164214 A1    Jul. 10, 2008

Related U.S. Application Data

(63) Continuation of application No. PCT/RU2006/000410, filed on Aug. 3, 2006.

(30) Foreign Application Priority Data

Aug. 8, 2005 (RU) .................... 2005125140

(51) Int. Cl.
*B01J 20/06* (2006.01)
(52) U.S. Cl. .............. 210/496; 210/502.1; 210/505; 442/351; 442/415; 442/417; 502/402; 502/414
(58) Field of Classification Search .......... 210/496, 210/502.1, 505, 507, 508; 502/414, 415, 502/439, 402; 442/351, 417, 415
See application file for complete search history.

(56) References Cited

U.S. PATENT DOCUMENTS
5,585,171 A * 12/1996 Libutti et al. .......... 442/415
(Continued)

FOREIGN PATENT DOCUMENTS
RU    2063383 C1    7/1996
(Continued)

OTHER PUBLICATIONS
International Search Report from International Application No. PCT/RU2006/000410, filed Aug. 3, 2006, mailed on Dec. 28, 2006.
(Continued)

*Primary Examiner* — Matthew Savage
(74) *Attorney, Agent, or Firm* — Houston Eliseeva, LLP

(57) ABSTRACT

The invention concerns the production of filter materials for the purification and disinfection of water, water solutions and other liquids, as well as for sterilizing filtration of injections and other solutions, for concentration of biomolecules in physiological liquids, concentration and extraction of viruses, preparation of apyrogenic water, in biocatalytic diaphragm reactors. The invention solves the problems of a new filter material production, characterized by high sorption properties, high retention efficiency of submicron electronegative particles, microorganisms, submicron non-polar particles and chemical contaminations, and, at the same time, characterized by low hydrodynamic resistance. A base of filter material is the nonwoven organic synthetic polymeric fabric, modified by the aluminum hydroxide particles, fixed to the surface of base fibers for improvement of its sorption properties and for making it positively charged. A method of filter material production comprises: applying the modifying composition onto the fibrous base in the form of organic nonwoven synthetic polymeric fabric, wherein said modifying composition comprises the particles of the aluminum-based material, hydrolysis thereof results to formation and fixation of the aluminum hydroxide particles to the base fibers. A method of fluid filtration is carried out using the filter material as a non-woven organic synthetic polymeric fabric, to the fibers of which the aluminum hydroxide particles are fixed.

3 Claims, 1 Drawing Sheet

U.S. PATENT DOCUMENTS

| | | | | |
|---|---|---|---|---|
| 5,688,588 | A | * | 11/1997 | Cotton et al. ............... 428/305.5 |
| 6,034,010 | A | * | 3/2000 | Cartwright et al. ............ 442/417 |
| 6,838,005 | B2 | | 1/2005 | Tepper et al. |
| 7,601,262 | B1 | * | 10/2009 | Tepper et al. ............... 210/502.1 |
| 2005/0026526 | A1 | * | 2/2005 | Verdegan et al. .............. 442/340 |

FOREIGN PATENT DOCUMENTS

| | | |
|---|---|---|
| RU | 2075345 C1 | 3/1997 |
| RU | 2135262 C1 | 8/1999 |
| RU | 2168357 C2 | 6/2001 |
| RU | 2242276 | 12/2004 |
| SU | 1066942 A | 1/1984 |

OTHER PUBLICATIONS

English translation of International Preliminary Report on Patentability, mailed Dec. 28, 2006, from International Application No. PCT/RU2006/000410, filed Aug. 3, 2006.

* cited by examiner

NON-WOVEN POLYMERIC FABRIC INCLUDING AGGLOMERATES OF ALUMINUM HYDROXIDE NANO-FIBERS FOR FILTERING WATER

RELATED APPLICATIONS

This application is a continuation application of PCT application serial number PCT/RU2006/000410, filed on Aug. 3, 2006, which is incorporated herein by reference in its entirety, which, in turn, claims priority to Russian Patent Application No. RU 2005125140, filed on Aug. 8, 2005, which is incorporated herein by reference in its entirety.

BACKGROUND OF THE INVENTION

The invention relates to the production of filter materials with high absorbing and filtering properties, especially relating to the production of filter materials based on synthetic polymeric fibers for fine purification and disinfecting of water, water solutions and other liquids, and it also can be used in medicine and microbiology for sterilizing filtration of injections and other solutions, for the concentration of biomolecules in physiological liquids, for the concentration and extraction of viruses, for apyrogenic water preparation, and in biocatalytic membrane reactors.

There are nonwoven materials made of thin polymeric fibers, prepared by the electrospinning method, the so-called Petryanov fabrics (filters), designed for gas and liquid filtration, bacterial gas purification [High-performance gas cleaning from aerosols with Petryanov filters/P. I. Basmanov, V. I. Kirichenko, Y. N. Filatov, Y. L. Yurov; ex. ed. V. I. Kirichenko. —Moscow: Science, 2003. -271 p.]

The properties of these materials are based on the adhesion of admixture particles in liquid and gas on the filter fibers at their collision. However, they are inefficient in water purification from pathogenic flora due to the weak adhesion of microorganisms to filter fibers in aqueous medium.

There is a method of adsorbent production [RU 2075345 C1, 1997], where ultrafine aluminum powder with specific surface area ranging from 5 to 20 m$^2$/g, produced by electrical explosion of aluminum wire in argon medium, is treated with water at a temperature from 50 to 60° C. followed by heating at a temperature from 300 to 500° C. during 1 or 3 hours.

The adsorbent based on ultrafine aluminum oxide provides high sorption capacity relative to water-soluble mineral oils, phenols and heavy metals.

There is a method of adsorbents production [RU 2168357 C2, 2001] based on oxide materials, where ultrafine aluminum powder with specific surface area ranging from 5 to 20 m$^2$/g, produced by electrical explosion of aluminum wire in argon, is treated with water at a temperature from 50 to 60° C., heated at a temperature from 200 to 300° C. during 1 or 3 hours, refluxed in saturated sodium bicarbonate solution during 0.5 or 1.5 hours followed by reheating at a temperature from 200 to 300° C.

This method improves the powder absorbability relative to phenols, heavy metals and halogens without capacity loss relative to the water-soluble mineral oils.

There is a method of fine purification of highly-contaminated water [RU 94003073 A, 1995]. The invention is meant for water purification for domestic needs mainly in emergency situations. The aim of the invention is to increase the efficiency of purification process of the highly-contaminated water from mineral oils and mineral contaminations. The gist: highly-contaminated water is sequentially passing through the layer of cellulose, activated by 5% admixture of oxidized atactic polypropylene, through the layer of active aluminum oxide, prepared in the process of ultrafine aluminum powder oxidation in water; with aluminum powder i.e., the product of aluminum wire electrical explosion.

An inorganic adsorbent, i.e., aluminum oxyhydroxide AlOOH (boehmite) with a pore size from 60 to 90 nm subjected to the hydrothermal pretreatment is used for water purification from enteroviruses [SU 1066942 A, 1982] with a particle size from 20 to 30 nm. This method allows achieving 100% purification at concentration of viruses in water ranging from 1.5 to 6.28 lg PFU50/ml and at pH medium being within the limits from 7.0 to 7.5.

The disadvantage of this method is the required prolonged contact (from 2 to 6 hours) of viruliferous water with an adsorbent.

Application of water purification method, described in [RU 94003073 A, 1995] and adsorbents [RU 2075345 C1, 1997, RU 2168357 C2, 2001] in the form of filter filling requires high pressures applied due to the high hydrodynamic resistance of adsorbent layer. At the same time, there is a carryover of adsorbents by the fluid flow through the filter barriers. Besides, all the methods provide the heating phase of the adsorbent at a temperature from 200 to 300° C. that makes the product more expensive.

There is a method of electropositive sorbent production [U.S. Pat. No. 6,838,005 B1, 2005], which comprises the mixing of nonspherical aluminum oxide particles or aluminum source, which then reacts with water solution thus generating the nonspherical aluminum oxide particles with the second solid component, i.e., particles of fibrous material. The filter material is mould of this composite using the "paper" technology.

There is a sorbent, which consists of nonspherical aluminum oxide particles and particles of fibrous material and includes a component with a surface negative charge and modifying composition, chosen from the row of magnesium oxide or magnesium hydroxide, silicon or their mixture [RU 2242276 C1, 2004]. The method of sorbent production comprises the mixing of nonspherical aluminum oxide particles with the fibrous material particles. Before mixing, the component with a surface negative charge is added to the fibrous material. After these three components being mixed, the modifying composition is added to the mixture. Besides, in the process of mixing of the first three components, the mixture activation is conducted by electric current or ultrasound. Then the filter material is mould of this composite using the "paper" technology.

The main disadvantage of the above-mentioned sorbents is the using of micron glass fiber [U.S. Pat. No. 6,838,005 B1, 2005] and cellulose [RU 2242276 C1, 2004] as a fiber base. Glass fiber can be harmful if its particles penetrate into the filtered liquid, and cellulose is a nutrient medium for bacteria and unwanted in filters of long-term usage. Besides, the formation of filter materials using the "paper making" technology restricts the range of materials, which can be used as the second solid component (fibrous base), because all the mixture components for this formation are used as a suspension of single small particles. When the fibers made of polymeric materials with a diameter, less than 2 µm are used, it is difficult to get a mechanically strong material using the "paper making" technology. At the same time, just these materials have the qualities, preferable at production of filter materials.

A considerable disadvantage of this sorbent production method [RU 2242276 C1, 2004] is the necessity of mixture activation by electric current or ultrasound that makes the sorbent production technology more expensive and complicated.

There is a method of filter element modification [RU 2135262 C1, 1999], which involves the workpiece impregnation of the filter element, formed of carbonic nonwoven fabric, referring to the synthetic polymeric materials, by the modifying composition. The modifying composition represents water-organic solution of the nanostructured silver particles. A filter element, produced by this method, allows filtering out microbiological admixtures from water.

As it is defined in the description, after the carbon fiber material being treated by silver solution, there are, at least, one hundred viable bacterial cells less left in the filtrate as compared with the used untreated material. This is due to the silver antibacterial properties, but at the same time, there are toxins penetrating into the filtrate, generated as a result of microorganisms' death. The impoverishment of bacterial cells by one hundred is insufficient, when there is a high concentration of microorganisms in the original liquid, e.g., 104 CFU/ml.

Besides, carbon fiber is a very expensive material.

SUMMARY OF THE INVENTION

The object of the invention is the production of a new filter material, which has high sorption properties; high retention efficiency of submicron electronegative particles, microorganisms, submicron non-polar particles and chemical contaminations, and, at the same time, has low hydrodynamic resistance.

This object is achieved in the way that the filter material contains the base of nonwoven organic synthetic polymeric fabric, to the fibers of which the aluminum hydroxide particles are fixed.

It is expedient to choose the fabric, produced by the electrospinning method, e.g., from cellulose acetate or polysulfone with a fiber diameter from 1.0 to 3.0 µm, as a nonwoven organic synthetic polymeric fabric.

It is expedient that aluminum hydroxide particles, which are fixed to the surface of nonwoven organic synthetic polymeric fabric, have the size from 0.2 to 5.0 µm, specific surface area ranging from 100 to 250 $m^2/g$ and porosity from 50 to 95%.

It is desirable that aluminum hydroxide particles were fixed to the surface as well as inside the nonwoven organic synthetic polymeric fabric.

It is preferable that the quantity of aluminum hydroxide particles fixed to the cellulose acetate or polysulfone fibers was from 15 to 45 mass. %.

The object is also achieved that the method production of filter material comprises the modifying composition applied to the fibrous base in the form nonwoven synthetic polymeric fabric.

The novelty of the invention is that the nonwoven organic synthetic polymeric fabric is used as a base and the modifying composition contains the particles of the aluminum-based material. As a result of these particles hydrolysis, the aluminum hydroxide particle are formed and fixed to the base fibers.

It is expedient that the nonwoven organic synthetic polymeric fabric with a fiber diameter from 1.0 to 3.0 µm is produced by the electrospinning method, e.g., from cellulose acetate or polysulfone.

It is expedient that aluminum powder with particle size less than 1 µm is used as an aluminum-based material.

It is preferable to use aluminum powder with specific surface area ranging from 7 to 28 $m^2/g$, which is produced by the method of electrical explosion of aluminum wire as an aluminum-based material.

Besides, the aluminum-based material applied to the fibrous base is an aqueous suspension or aqueous-alcoholic suspension.

Besides, hydrolysis of the aluminum-based material applied to the fibrous base, is carried out at a temperature from 10 to 100° C., preferably from 50 to 70° C., during from 10 min to 48 h, preferably from 30 to 60 min.

Besides, upon the hydrolysis completed, the filter material is washed with water for the aluminum hydroxide particles, non-fixed to the base fibers, to be removed.

One more object of the invention is a method of fluid filtration. This method comprises the contact of fluid with the filter material.

The novelty of the invention is that the organic synthetic polymeric fabric is used as a filter material and aluminum hydroxide particles are fixed to the fibers of this fabric.

It is expedient that a nonwoven organic synthetic polymeric fabric is produced by the electrospinning method, e.g., from cellulose acetate or polysulfone.

The preferable quantity of aluminum hydroxide per surface unit of filter material is from 80 to 100 $mg/cm^2$ At the same time, the filter material retains electronegative particles, e.g., bacteria, viruses, colloidal particles, pyrogens, nucleic acids, proteins, etc.

Besides, filter material sterilizes water.

Besides, filter material retains non-polar particles and chemical contaminations, e.g., particles of insoluble oxides and hydroxides, water-soluble mineral oils, phenols, halogens, heavy metal ions.

Besides, filter material is used for the integrated water purification.

Besides, the said fluid represents water, water solution, biological fluid.

It is expedient that the filter material is a part of the filter.

BRIEF DESCRIPTION OF THE DRAWINGS

It is possible to understand and investigate the invention completely in the detailed description given below, with reference to examples and a chart with.

DETAILED DESCRIPTION OF THE PREFERRED EMBODIMENTS

Figure 1:
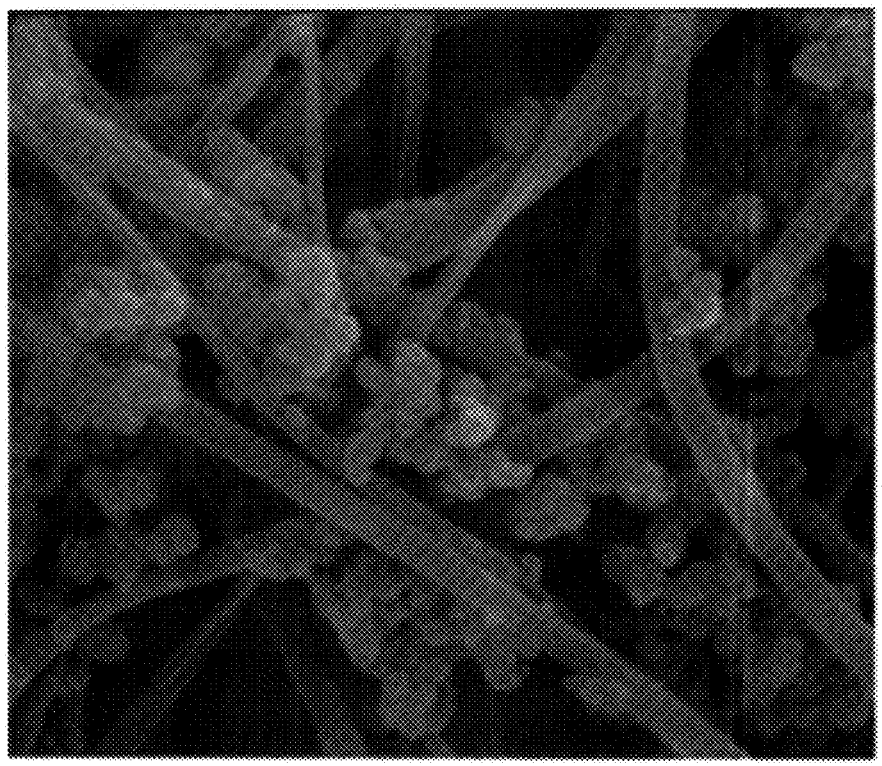
FIG. 1 is a photomicrography of base fibers, modified by porous particles of aluminum hydroxide.

The material characterized by high retention efficiency of submicron electronegative particles, including microorganisms, submicron non-polar particles and chemical contaminations, and at the same time, by low hydrodynamic resistance, must have a developed surface, high positive charge on the surface of particles and sufficiently high porosity. Aluminum hydroxide, produced by the hydrolysis of aluminum nanopowders, has a developed surface and an electropositive charge. However, there are two essential problems when using the given sorbent in filters as a powder layer on any filter carrier. The problems are caused by the submicron size of sorbent particles: high hydrodynamic resistance of the sorbent layer and the migration of sorbent particles to the filtrate through the porous filter carriers. The mechanical mixing of the sorbent with any inert filler material or alternation of sorbent layers and fiber material allows minimizing these negative points, especially at the beginning of filter usage, though it does not solve the problem completely. Sorbent particles are washed out by the fluid flow, migrate through the layers of fibrous material, consolidate and give rise to the hydrodynamic resistance.

The technical result is achieved by applying the aluminum-based nanopowder particles to the base fibers made of synthetic polymeric material in aqueous medium. The polymeric materials are chosen, which can obtain a negative charge in aqueous medium, e.g., cellulose acetate or polysulfone. The electropositive particles consisted of different oxide-hydroxide aluminum phases, considered as aluminum hydroxide in this invention, are formed in the process of hydrolysis of the aluminum-based nanopowder particles. These electropositive particles are fixed to the negatively charged fibers of the organic synthetic polymeric fabric-base due to the adhesion forces. In this case, the base specific surface area is increased and additional porosity is obtained for the filter material.

Fiber sheeting can be used as a base, e.g., polymeric fabric, produced by the electrospinning method. As a result, the composite material is formed representing a spatial frame of polymeric microfibers. The basic mass of porous particles representing agglomerates, formed by the aluminum hydroxide nanofibers, is fixed at the points of contacts of microfibers. Each part of the formed composite material performs its own function, i.e., the polymeric material has high porosity and provides the required filtration rate. Agglomerates of the aluminum hydroxide, fixed to the surface of base fibers, do not reduce the filtration rate due to the adhesion forces; they do not migrate into the filtrate and provide the material with high sorption properties including the capability of retaining the microorganisms. Thus, the composite material combines positive qualities of both components, i.e., mechanical strength, resistance to the effect of the filtered medium, high filtration rate and high efficiency to retain different contaminants including microbiological ones.

According to the invention, the porous sheet material (nonwoven fabric) is supposed to be used as a base made of synthetic polymeric fibers with a diameter from 1.0 to 3.0 µm, which is nontoxic, water-resistant, hydrophilic or it is possible to provide it with hydrophilic properties with softening temperature not lower than 110° C.

The advantage of materials made of polymeric fibers is in their chemical and biological inertness and in capability of maintaining the mechanical strength even after long-term underwater. These materials are resistant to microbiological destruction and this is proved to be significant for the production of water-purifying filters. The present level of technological expansion allows deriving the high-porous fabrics with low aerodynamic and hydrodynamic resistance from polymeric fibers, which are suitable for gas and liquid purification [High-performance gas cleaning from aerosols with Petryanov filters/P. I. Basmanov, V. I. Kirichenko, Y. N. Filatov, Y. L. Yurov; ex. ed. V. I. Kirichenko. —Moscow: Science, 2003. -271 p.]

It is proposed to use the aluminum hydroxide particles, produced by hydrolysis of the aluminum-based submicron powders, as a sorbent for modification of fibers. Aluminum nanopowders, produced by the gas-cycle and mechano-chemical method, can be used as an aluminum-based material. Aluminum nanopowders, produced by the wire electrical explosion method, are the most preferable. These powders show high chemical activity; consequently they easily react with water at a temperature from 40 to 60° C.

The hydrolysate is an aluminum hydroxide with specific surface area ranging from 100 to 250 $m^2/g$ and high sorption properties [RU 2075345 C1, 1997, RU 2168357 C2, 2001].

The Hydrolysis of aluminum nanopowders is carried out under soft conditions at a temperature from 40 to 60° C. that allows conducting it directly on the surface of polymeric material fibers, produced by the electrospinning method (Petryanov filter), hence, there is neither polymer destruction nor structural failure of fibers or the material itself.

Filters made of polymers with the highest thermal resistance and hydrophilic properties were chosen from a wide range of Petryanov filters for the production of proposed filter material.

Two materials appeared to be the most preferable for the usage:

a) nonwoven fabric from cellulose acetate (Petryanov filter from cellulose acetate 15-2.0) with average fiber diameter of 1.7 µm; surface density of 32 $g/m^2$ (space filling 3.0%), standard hydrodynamic resistance of 2.0 mm w.c. (water column) for gas filtration;

b) nonwoven fabric from polysulfone YUDEL-1700 (Petryanov filter from polysulfone-6C) with surface density of 28 $m^2/g$, the material consists of three layers with average fiber diameter of the inner layer from 1 to 1.2 µm, of outer layers from 2 to 2.5 µm, with density of outer layers being 9 $g/m^2$, density of the inner layer being 9 $g/m^2$ for gas filtration, liquid filtration, bacterial gas cleaning.

The inventions are presented in FIG. 1, where the base fiber photomicrography is shown (Petryanov filter from cellulose acetate from 15 to 2.0), modified by porous particles of aluminum hydroxide.

It is shown in FIG. 1 that the base fibers are covered with fixed porous particles, represented as dispersed or combined agglomerates of the aluminum hydroxide nanofibers from 0.2 to 5.0 µm in size.

EXAMPLE 1

Suspension is prepared from 180 ml of distilled water, 20 ml of ethyl alcohol and 2 g of Al/AlN powder, produced by the wire electrical explosion method, with specific surface area of 21 $m^2/g$. A workpiece of 50×50 cm in size is cut out of the nonwoven polysulfone fabric with surface density of 28 $g/m^2$, and then it is put into the container with prepared suspension for 10 min for impregnation at room temperature. Here the powder is absorbed on the fibers of nonwoven fabric and the workpiece dyes black. Then the workpiece is taken out of the container, squeezed and washed for the surplus suspension to be removed. When heating the workpiece up to a temperature of 57° C., the hydrolysis reaction starts, accompanied by evolution of small amount of ammonia and hydrogen and discoloration of the workpiece from black to white due to the Al/AlN conversion into white aluminum hydroxide. With hydrolysis completed, the workpiece is put into the drying box for 4 hours. The material containing 27 mass. % of aluminum hydroxide with average particle size of 0.8 µm, with specific surface area of 180 $m^2/g$ and porosity of 80% is produced. Filters of the required thickness are formed by folding of 6, 8, 10 or another number layers of filter material. The formed filters are tested for the virus absorption efficiency. The results are given in Tab. 1. For comparison, the testing results of the 6-layer filter from non-modified nonwoven polysulfone fabric are presented in Tab. 1.

The samples were tested for titration of the bacteriophage MS2. The bacteriophage MS2 represents a microorganism innocuous for human beings, imitating pathogenic viruses. Each sample was placed between two Millipore membranes (0.45 µm) and pressed in the experimental cell. Then the bacteriophage MS2 suspension (2 ml) is passed through the cell with the sample of filter material. The bacteriophage concentrations are monitored at the input and outlet of the cell. The arithmetic average of three analyses is taken for granted.

TABLE 1

| Concentration of MS2 in the original suspension, PFU/ml | Nonwoven fabric from polysulfone, 6 layers | Modified nonwoven fabric from polysulfone | | |
|---|---|---|---|---|
| | | 6 layers of sorbent 60 mg/cm$^2$ | 8 layers of sorbent 80 mg/cm$^2$ | 12 layers of sorbent 120 mg/cm$^2$ |
| | | Retention of MS2, % | | |
| $1.4 \cdot 10^4$ | 38.6 | 99.3 | 100 | 100 |
| $1.3 \cdot 10^5$ | 15.4 | 99.6 | 99.8 | 100 |
| $1.0 \cdot 10^6$ | 0 | 99.1 | 99.8 | 100 |

Thus, when changing the filter thickness, it is possible to achieve the required purification efficiency, taking into account the fouling factor of purified liquid and filtration rates.

The filter can be formed by folding the filter material in several layers without agglutination or with agglutination by any means, excluding the occurrence of through-holes in the material.

EXAMPLE 2

Suspension is prepared from 200 ml of distilled water and 2 g of Al/AlN powder, produced by the wire electrical explosion method, with specific surface area of 21 m$^2$/g. A workpiece of 50×50 cm in size is cut out of the nonwoven cellulose acetate fabric with surface density of 32 g/m$^2$, and then it is put into the container with prepared suspension for 10 min for impregnation at room temperature. Then the workpiece is taken out of the container and washed with distilled water for the non-fixed particles of aluminum hydroxide to be removed. Hydrolysis and drying are carried out similarly to Example 1. As a result, the material containing 35 mass. % of aluminum hydroxide with mean particle size of 0.9 μm, with specific surface area of 185 m$^2$/g and porosity of 85% is produced. The filter is formed by folding 14 layers of filter material similarly to Example 1 and then it is tested for virus absorption. The results are given in Tab. 2.

TABLE 2

| Concentration of MS2 in the original suspension, PFU/ml | Retention of MS2, % |
|---|---|
| $1.55 \times 10^4$ | 100 |
| $2.50 \times 10^5$ | 100 |
| $3.75 \times 10^6$ | 100 |
| $2.0 \times 10^7$ | 99.9998 |

The proposed filter material has average pore size of 1 μm and, respectively, shows low hydrodynamic resistance and high filtration rate.

The rate of distilled water filtration under different pressures is given in Tab. 3.

TABLE 3

| Filter pressure, atm | Volume filtration rate, cm$^3$/cm$^2$min |
|---|---|
| 0.5 | 33.5 |
| 0.75 | 47.7 |
| 1.0 | 63.6 |
| 1.5 | 86.8 |
| 2.0 | 103.2 |

EXAMPLE 3

Suspension is prepared from 200 ml of distilled water and 2 g of aluminum powder, produced by the wire electrical explosion method, with specific surface area of 15 m$^2$/g and average particle size of 150 nm. A workpiece of 50×50 cm in size is cut out of the nonwoven cellulose acetate fabric with surface density of 32 g/m$^2$, and then it is put into the container with prepared suspension for 10 min for impregnation at room temperature. Here the workpiece dyes black due to the aluminum particles absorption on the fibers of the material. Then the workpiece is taken out of the container, squeezed for the surplus suspension to be removed and put into the container with water heated up to 60° C. for the hydrolysis of absorbed aluminum powder Hydrolysis starts with the extraction of gas bubble (hydrogen) from the surface of the workpiece and discoloration of the workpiece from black to white. With hydrolysis completed approximately in 20 min when the workpiece is taken out of the container, put into the vessel with clear water and washed for the non-concentrated particles of aluminum hydroxide to be removed. Then hydrolysis is carried out similarly to the Examples 1 and 2. The formed filter material is dried for 8 hours at 120° C. As a result, the material containing 30 mass. % of aluminum hydroxide with average particle size of 0.8 μm, with specific surface area of 250 m$^2$/g and porosity of 95% is produced. The filter of 1.1 mm thick is formed from the prepared filter material, and the sorption of heavy metals, phenols and water-soluble mineral oils is determined using the formed filter (Tab. 4).

TABLE 4

| Contamination | Original concentration, mg/l | Residual concentration, mg/l |
|---|---|---|
| Fe | 0.5 | 0.05 |
| As | 0.04 | 0.003 |
| Ni | 0.5 | 0.08 |
| Hg | 0.01 | 0.0008 |
| Phenol | 0.005 | 0.001 |
| Water-soluble mineral oils | 0.01 | 0.001 |

INDUSTRIAL UTILITY

The proposed filter material shows high absorbing and filtering properties that allow using it for fine purification and disinfection of water, water solutions and other liquids; it can be also used in medicine and microbiology for sterilizing filtration of injections and other solutions, for concentration of biomolecules in physiological liquids, concentration and extraction of viruses, preparation of apyrogenic water, in biocatalytic membrane reactors.

While this invention has been particularly shown and described with references to preferred embodiments thereof, it will be understood by those skilled in the art that various changes in form and details may be made therein without departing from the scope of the invention encompassed by the appended claims.

What is claimed is:

1. A filtering material comprising:
   a non-woven organic synthetic polymer fabric as a base; and
   positively charged agglomerates of aluminum hydroxide nano-fibers;
   wherein the non-woven organic synthetic polymer fabric is formed of negatively charged fibers produced by an electrospinning method, wherein said negatively charged fibers have a diameter of 1.0 to 3.0 um; and
   wherein the positively charged agglomerates of aluminum hydroxide nano-fibers are fixed to the negatively charged fibers of the non-woven organic synthetic polymer fibrous fabric by electrostatic adhesion forces, and
   wherein the agglomerates of aluminum hydroxide nano-fibers have dimensions in a range of 0.2 to 5.0 um with specific surface area in a range of 100 to 250 $m^2/g$ and pore volume in a range of 50 to 95%.

2. The material of claim 1, wherein the amount of agglomerates of aluminum hydroxide nano-fibers is in a range of 15 to 45 mass. % of the filtering material.

3. The material of claim 1, wherein said agglomerates of the aluminum hydroxide nano-fibers are fixed to the fibers of the nonwoven organic synthetic polymer fibrous fabric both on an exterior surface of the fabric and on an inside of the fabric.

* * * * *

UNITED STATES PATENT AND TRADEMARK OFFICE
CERTIFICATE OF CORRECTION

| | |
|---|---|
| PATENT NO. | : 8,033,400 B2 |
| APPLICATION NO. | : 12/025543 |
| DATED | : October 11, 2011 |
| INVENTOR(S) | : Marat Izrailievich Lerner et al. |

It is certified that error appears in the above-identified patent and that said Letters Patent is hereby corrected as shown below:

On the face sheet, at paragraph (73) Assignee: After "Tomsk (RU)" insert --Organization of the Russian Academy of Sciences, Institute of Strength Physics and Materials Science of Siberian Branch of the RAS (ISPMS SB RAS), Tomsk (RU)--.

Signed and Sealed this
Twenty-ninth Day of May, 2012

David J. Kappos
*Director of the United States Patent and Trademark Office*